J. L. MOTT.
Car Wheel.
No. 11,041.
Patented June 6, 1854.
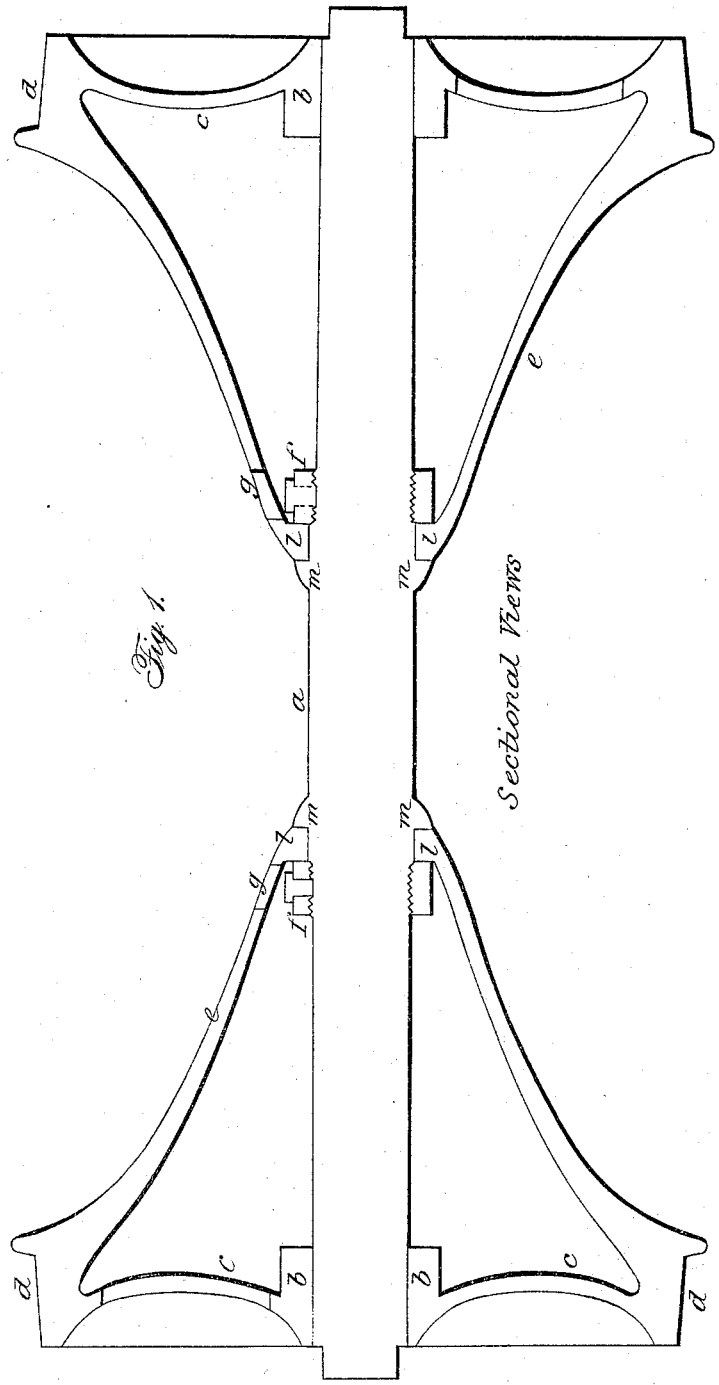
Fig. 1.
Sectional Views
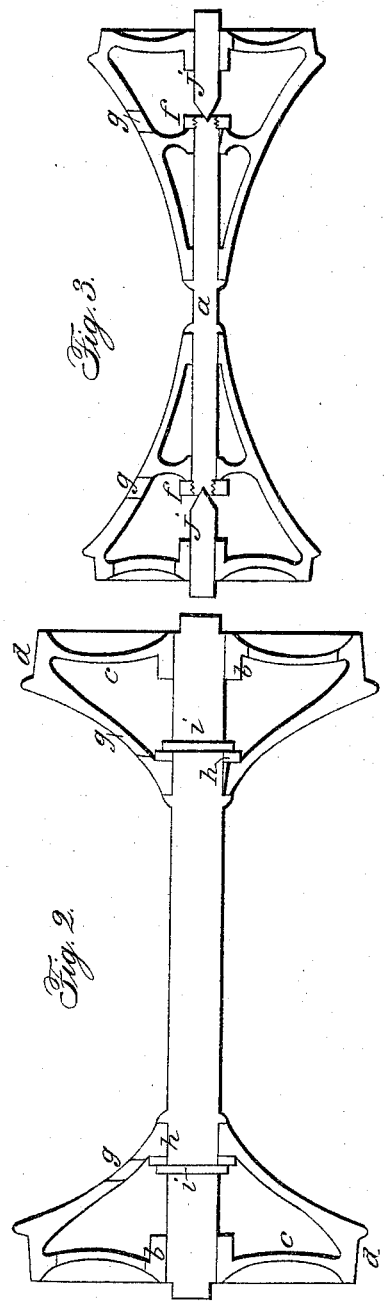
Fig. 3.
Fig. 2.

UNITED STATES PATENT OFFICE.

JORDAN L. MOTT, OF NEW YORK, N. Y.

SECURING CAR-WHEELS UPON AXLES.

Specification of Letters Patent No. 11,041, dated June 6, 1854.

*To all whom it may concern:*

Be it known that I, JORDAN L. MOTT, of the city, county, and State of New York, have invented a certain new and useful Improvement in the Method of Securing the Wheels of Railroad-Cars on Their Axles, of which the following is a full, clear, and exact description, reference being had to the accompanying drawings, making part of this specification, in which—

Figure 1, is a section of a pair of wheels on their axle, taken in the plane of the axis to represent my improved method of securing; and Figs. 2 and 3, like views of modifications.

The same letters indicate like parts in all the figures.

My invention relates to a method of securing onto their axles, cast iron hollow wheels, such, for instance, as the hollow conical wheels for which I have filed an application for Letters Patent, or any other hollow wheel with the hub made in two parts. And my said invention consists in securing the wheel to the axle by means of a nut, screwed onto the axle within the wheel, or, as the equivalent therefor, by means of a washer secured to the axle by a wedge, key or screw, whereby I avoid straining the hub, as when it is driven and keyed onto the axle.

In the accompanying drawings $d$, $d$, represent two wheels made on a plan invented by me, and for which I have made application for Letters Patent, which wheels consist of an outer plate $c$, or spokes as the equivalent, forming the connection between the rim and the outer hub $b$ and an inner conical plate $e$ forming the connection between the flanched or inner edge of the rim and the inner hub $l$, the hub being made in two parts, the one $b$, near the journal, and the other $l$, about midway between the end and the middle of the axle $a$, more or less.

The axle is formed with two shoulders $m$, $m$, against which the inner hubs of the wheels rest, and against which they are firmly held by nuts $f$, $f$, tapped onto the axle within the wheel; or, instead of this, the wheels may be secured each by means of a washer $h$, as in Fig. 2, secured by a wedge key $i$, or by a screw inserted through a hole $g$, in the conical plate $e$. Or, instead of this, the wheels may be mounted on the axle as represented in Fig. 3, in which the axle only extends through the inner hubs sufficiently far to receive the securing nuts $f$, $f$, and then short bearing axles $j$, $j$, pass through the outer hubs and are pivoted into the ends of the main axle.

The short axles $j$, $j$, should be firmly secured to the car that the outer hubs may turn on them.

The securing nuts or washers can either be molded in the core in which the inside of the wheel is cast, or they can be introduced inside of the wheels through holes in the plate $c$. In this way the wheels can be secured onto their axles without straining the hubs, as when they are driven on, and, if desired, they can be so secured as either to turn on or with the axle, as the distance between the two parts of the hub will effectually brace and give ample support against lateral thrusts.

What I claim as my invention and desire to secure by Letters Patent is—

The method substantially as herein described, of securing railroad car wheels to their axles, by means of a nut or the equivalent therefor, within the wheel as set forth.

JORDAN L. MOTT.

Witnesses:
WM. H. BISHOP,
CHAS. W. BAMBUGH.